United States Patent [19]

Murphy

[11] 4,081,148

[45] Mar. 28, 1978

[54] PLANT SUPPORT

[76] Inventor: George W. Murphy, 2328 Ashwood La., Norman, Okla. 73069

[21] Appl. No.: 604,355

[22] Filed: Aug. 13, 1975

[51] Int. Cl.² .............................................. B21F 27/02
[52] U.S. Cl. ........................................ 245/5; 47/46; 256/45; 403/207
[58] Field of Search ..................................... 47/44–47; 256/32, 45; 140/9; 248/27.8; 245/5, 4; 52/653; 403/331, 335, 341, 342, 346, 352, 367, 380, 347, 214, 208, 209, 213, 93–97, 207

[56] References Cited

U.S. PATENT DOCUMENTS

| Re. 11,622 | 7/1897 | Warren et al. | 47/47 |
|---|---|---|---|
| D. 31,476 | 8/1899 | Srofe | 256/45 |
| 95,622 | 10/1869 | Whipple | 256/45 |
| 189,529 | 4/1877 | Van Eps | 256/45 |
| 212,064 | 2/1879 | Jenks | 47/47 |
| 357,067 | 2/1887 | Conner | 256/45 |
| 414,175 | 10/1889 | Whittaker | 47/47 |
| 425,745 | 4/1890 | Brown | 47/46 |
| 460,316 | 9/1891 | Webber | 245/5 |
| 483,969 | 10/1892 | Scarles | 256/45 |
| 509,343 | 11/1893 | Woodard | 245/5 |
| 760,879 | 5/1904 | Kunzman | 47/47 |
| 915,146 | 3/1909 | Woerner | 245/5 |
| 970,594 | 9/1910 | Young | 245/5 |
| 1,014,525 | 1/1912 | Schneider | 245/5 |
| 1,593,218 | 7/1926 | McClure | 256/35 |

FOREIGN PATENT DOCUMENTS

| 252,541 | 2/1967 | Germany | 47/47 |
|---|---|---|---|
| 19,624 of | 1898 | United Kingdom | 47/47 |
| 12,824 of | 1903 | United Kingdom | 47/46 |
| 19,165 of | 1909 | United Kingdom | 47/47 |
| 20,947 of | 1897 | United Kingdom | 47/47 |

Primary Examiner—Ernest T. Wright, Jr.
Assistant Examiner—James R. Feyrer
Attorney, Agent, or Firm—William R. Laney

[57] ABSTRACT

An improved plant support structure formed of relatively rigid, bent steel wire. In one form, the plant support comprises a plurality of wire elements each formed into a plurality of diamond-shaped segments with each element mutually interconnectable to a like element by means of a plurality of rigid, frictional, releasable wire interconnections. In an alternate form, the plant support of the present invention is formed of a longitudinal wire fabric web comprising a single strand of wire formed into a plurality of mutually interconnected transverse strand segments each bent into a zig-zag shape and interconnected to the next adjacent strand segment by means of frictional twisted wire connections. The plant support structure may be open fence-like trellis structures or closed substantially cylindrical structures.

3 Claims, 13 Drawing Figures

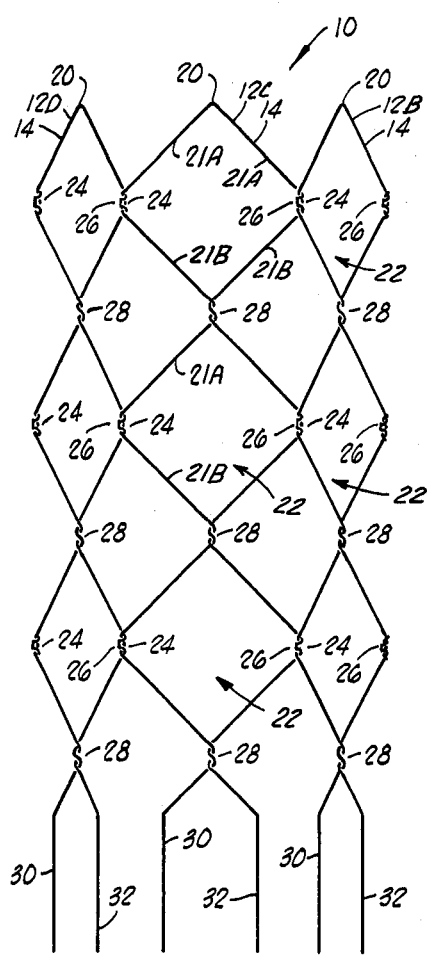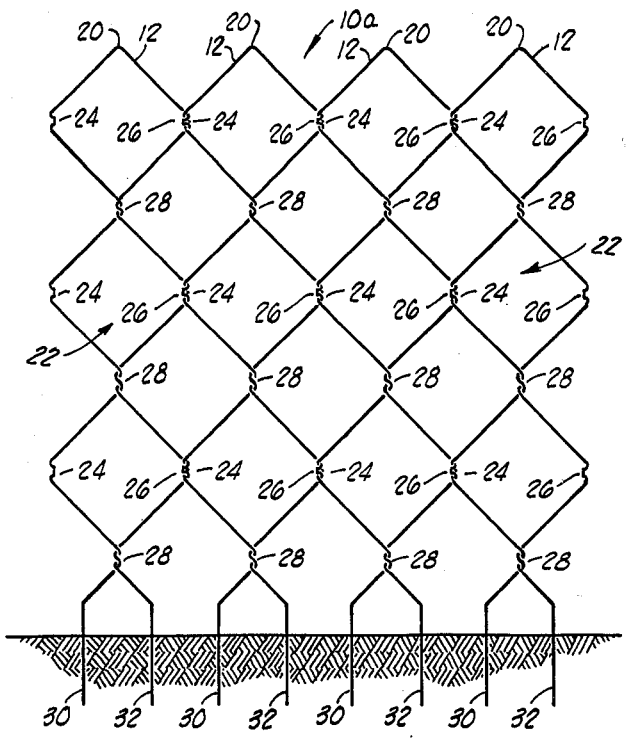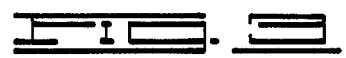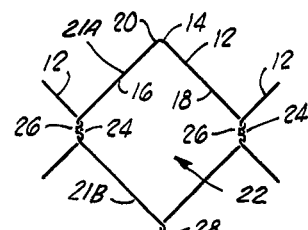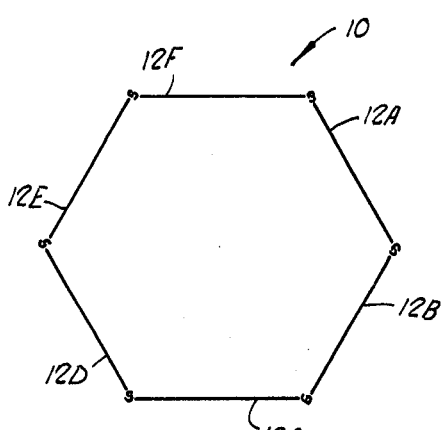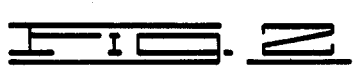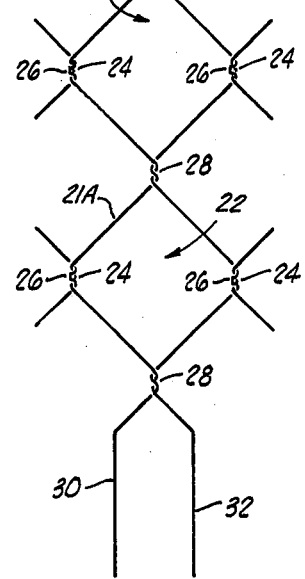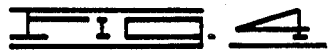

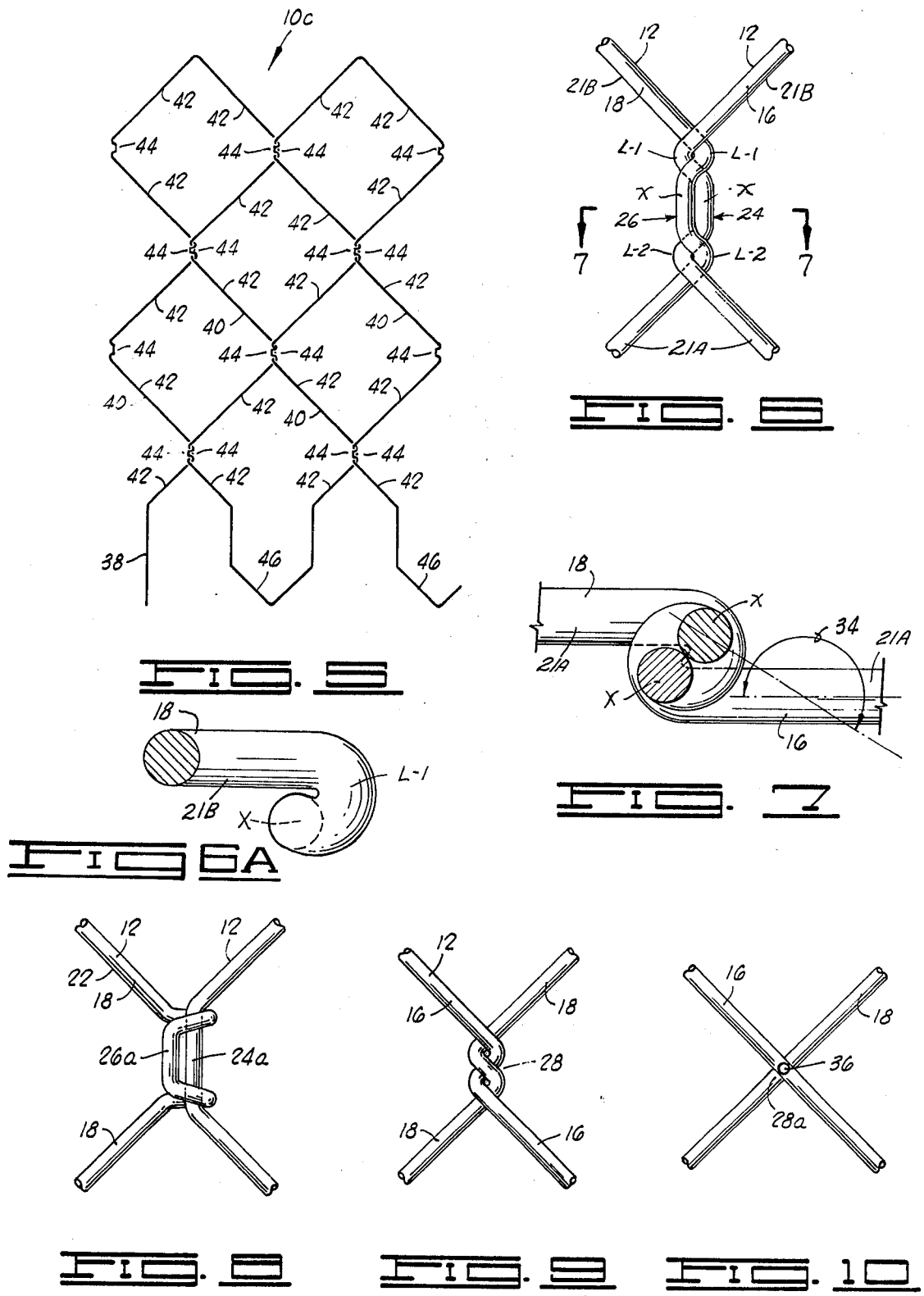

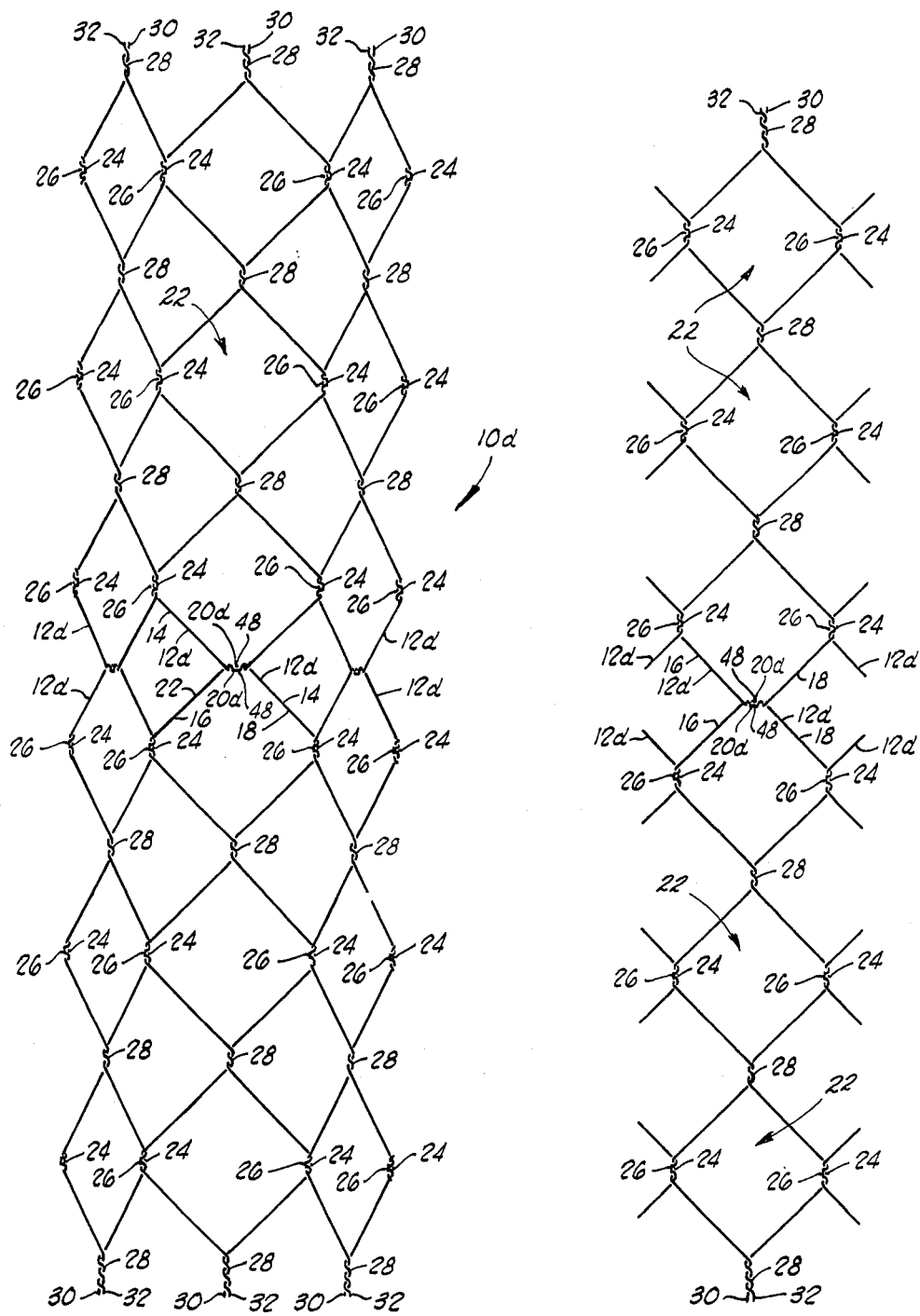

PLANT SUPPORT

BACKGROUND OF THE INVENTION

1. Field of the Invention

This invention relates generally to improvements in relatively rigid wire structures, and more particularly, but not by way of limitation, to improvements in structures for supporting growing plants.

2. Description of the Prior Art

The prior art contains a number of teachings of rigid wire structures suitable for supporting growing plants. To a great extent, the prior art devices are severely limited in that they are either not susceptible to convenient disassembly and storage, or are relatively expensive to construct.

SUMMARY OF THE INVENTION

The present invention contemplates a woven wire article of manufacture comprising a strand of wire formed into a plurality of zig-zag diagonal portions, adjacent zig-zag diagonal portions being interconnected by a bight portion, each bight portion being frictionally engageable with a corresponding bight portion of a like wire article of manufacture.

An object of the invention is to provide a plant support structure which is convenient to assemble and disassemble.

Another object of the invention is to provide a plant support structure which may be conveniently disassembled and stored when not in use.

A further object of the invention is to provide a wire structure having a simple, reliable and strong connection joint between adjacent wire elements.

A still further object of the invention is to provide a longitudinal wire fabric comprising a single strand of wire formed into a relatively rigid structure.

Other objects and advantages of the present invention will be evident from the following detailed description when read in conjunction with the accompanying drawings.

BRIEF DESCRIPTION OF THE DRAWINGS

FIG. 1 is an elevation view of one form of the plant support of the present invention formed into a substantially cylindrical structure.

FIG. 2 is a top plan view of the plant support of FIG. 1.

FIG. 3 is an elevation view of an alternate form of the plant support of the present invention formed into a fence-like trellis structure.

FIG. 4 is an elevational view of a woven wire element of the present invention including portions of adjacent like elements illustrating the interconnections therebetween.

FIG. 5 is an elevation view of an alternate form of woven wire structure for constructing the plant support of the present invention.

FIG. 6 is an enlarged elevation view of a novel connection joint between adjacent wire elements of the present invention.

FIG. 6A is a schematic illustration of the manner in which a bight portion formed between adjacent zigzag portions of a wire element is twisted out of the plane of the zigzag portions.

FIG. 7 is an enlarged cross-sectional view taken along line 7—7 of FIG. 6.

FIG. 8 is an enlarged elevation view of an alternate form of connection joint between adjacent wire elements of the present invention.

FIG. 9 is an enlarged elevation view of a rigid joint of the wire element of FIG. 4.

FIG. 10 is an enlarged elevation view of an alternate form of rigid joint of the wire element of FIG. 4.

FIG. 11 is an elevation view of another form of plant support of the present invention formed into a substantially cylindrical structure.

FIG. 12 is an elevation view of a modified woven wire element of the present invention including portions of adjacent like elements illustrating the interconnections therebetween.

DESCRIPTION OF THE PREFERRED EMBODIMENT

Referring now to the drawings and to FIGS. 1, 2 and 4 in particular, the plant support structure of the present invention will be generally designated by the reference character 10. The plant support 10 comprises a plurality of woven wire strand elements. 12 As shown in FIGS. 1 and 2, six elements 12A–12F are interconnected to form a substantially cylindrical, vertically aligned plant support structure 10. It will be understood that various numbers of elements 12 may be interconnected as shown in the drawings to provide cylindrical structures of a preselected diameter. It has been found that the use of six elements 12A–12F provides a suitable rigid plant support.

Each element 12 is formed of a single length or strand of relatively rigid wire 14 capable of being bent into a predetermined form and retaining such form. Each wire 14 is bent into two substantially equal length legs 16 and 18 at its apex 20. The legs 16 and 18 are each bent into a plurality of alternating, interconnected zigzag portions 21A and 21B, and these collectively form a plurality of substantially diamond-shaped segments 22. Each segment 22 includes a pair of horizontally, diagonally opposed bights or bends 24 and 26 of substantially identical configuration. The lower portion of each diamond-shape segment 22 is defined by a rigid connection 28 between the legs 16 and 18. The free ends 30 and 32 of the legs 16 and 18 extend downwardly from the lowermost rigid connection 28 in substantially parallel relation providing means for penetrating the ground to secure the element 12 in the ground. The diamond-shaped segments 22, including the respective zig-zag portions forming a part thereof, and the free ends 30 and 32 of each element 12 are substantially coplanar and are aligned in a vertical array along a substantially vertical axis.

As shown in FIGS. 6 and 7, the bight portions 24 and 26 of each diamond-shaped segment 22 are preferably identically shaped and mutually, frictionally, releasably engageable one with the other to secure adjacent elements 12 together to form the plant support 10. Each of the bight portions 24 and 26 is substantially U-shaped when viewed in elevation as shown in FIG. 6, and together with the adjacent zig-zag portions 21A and 21B between which it is located, forms a W in elevational configuration. Each U-shaped bight portion includes a pair of divergent legs L-1 and L-2, and a web portion X. Each web portion X is twisted about an axis substantially parallel to the axis of the vertical array of diamond-shaped segments 22 forming the element 12 through an angle 34 as most clearly shown in FIG. 7. The angle 34 is preferably greater than 180° and less than 360°. Stated differently, the web portion X of each of the bight portions 24 and 26 is twisted through an angle of more than 180° degrees from the plane containing the two zig-zag portions 21A and 21B adjacent the respective bight portion. This twisting to form a partially closed hook is shown in FIG. 6A of the drawings. To facilitate engagement and disengagement of interconnected bight portions 26 and 24, the angle 34 should preferably be of a value greater than 180° and less than 225°. It will be understood that variations in the magnitude of the angle 34 may be necessitated as a result of the employment of wire having differing physical characteristics in the construction of the elements 12. In releasably interconnecting the bight portions 24 and 26 with each other, the legs L-1 and L-2 of the two bight portions are crossed over each other, and the webs of each, forming partially closed hooks, are snapped together in an interference friction interlock in which they extend substantially parallel as shown in FIG. 6.

It has been found that a suitable wire for use in construction of the elements 12 of the plant support 10 is eleven gage or nine gage steel wire. Use of galvanized steel wire is further considered preferable due to its corrosion resistance.

FIG. 8 illustrates alternate configuration of the bight portions of the slightly modified diamond-shaped segments 22 designated by the reference characters 24a and 26a. It will be seen that the bight portion 24a is substantially vertical while the bight portion 26a is substantially U-shaped and is bent about a vertical axis substantially parallel to the vertical axis of the element 12 to secure the bight portion 24a therein. As with the previously described bight portion 26, the bight portion 26a is preferably bent through an angle greater than 180° and preferably less than 225° to provide releasable, frictional engagement with the bight portion 24a.

As shown in FIG. 9, the rigid connection 28 between the legs 16 and 18 at the lower end of each diamond-shaped segment 22 may be suitably formed by a twisting interengagement between the legs 16 and 18 about a vertical axis parallel to the vertical axis of the element 12. As an alternative, the interconnection between the legs 16 and 18 may be achieved by a suitable weld joint between the legs 16 and 18 such as is commonly provided by resistance welding as shown at 36. This alternate rigid connection is designated by the reference character 28a. As a further alternative, the releasable interconnection of bight portions of the type described above, and as shown in FIG. 6, may be used at this location. This is shown also in FIG. 5 and is hereinafter described.

Referring now to FIG. 3, an alternate form of the plant support of the present invention is shown generally designated by the reference character 10a. The plant support 10a comprises a plurality of the previously described wire elements 12 mutually interconnected by means of adjacent bight portions 24 and 26 to form a fence-like trellis structure. The length of the plant support 10a is determined by the number of elements 12 mutually interconnected to form the plant support 10a.

Referring now to FIG. 5, another alternative form of the plant support of the present invention is designated by the reference character 10c. The plant support 10c comprises a longitudinal wire fabric web formed of a unitary of wire 38 formed into a plurality of mutually interconnected, strand segments 40 each bent into a contiguous zig-zag portions 41A and 41B and comprising a plurality of oblique or diamond-shaped sections 42. Adjacent oblique segments 42 are interconnected by a U-shaped bight portion 44. The adjacent bight portions 44 of adjacent transverse strand segments 40 are mutually engaged by a frictional, twisted connection as previously described and illustrated in FIG. 6. The configuration of each bight portion 44 is identical to that previously described for the bight portions 24 and 26. The lower end portion of each strand segment 40 is continuously connected to the next adjacent strand portion 40 by a substantially V-shaped segment 46. It will be seen that the downwardly extending V-shaped segments 46 may be inserted into the ground to support the plant support 10c. It will be readily understood that by selecting a length of the wire fabric web of the plant support 10c a fence-like trellis can be formed thereby. Similarly, a length of the wire fabric web may be bent about its transverse axis to form a vertical cylindrical structure similar to that illustrated in FIG. 1. Mutual engagement of the bight portions 44 at the opposite ends of the length of wire fabric web, in a manner as shown in FIG. 6, will provide a rigid structure which may be readily disassembled for flat storage of the plant support 10c when not in use.

It should be noted at this point that the mutually interconnectable bight portions 24 and 26 and 44 may be readily formed by a suitable machine. In the manufacture of the wire fabric web illustrated in FIG. 5, the mutual interconnection of the bight portions 44 may be twisted together by suitable mechanical means during the formation of the wire fabric web.

Referring now to FIGS. 11 and 12 of the drawings, an alternate form of plant support structure constructed in accordance with the present invention is illustrated which is generally designated by the reference character 10d. The plant support 10d comprises a plurality of modified woven wire elements 12d. Each woven wire element 12d is substantially identical to the previously described woven wire element 12 described above and illustrated in FIGS. 1, 2 and 4. The woven wire element 12d differs from the woven wire element 12 in two ways. First, the apex of the juncture 20d of the legs 16 and 18 of the woven wire element 12d is formed into a bight or bend 48 having a configuration substantially identical to the previously described bights or bends 24 and 26 of each element 12 and bent about an axis normal to the vertical axis of the element 12d. Further, the element 12d is modified by terminating the free ends 30 and 32 of the legs 16 and 18 at the lower end of the lowermost rigid connection 28 providing means for penetrating the ground to secure the element 12d in the ground.

As described above for the plant support 10, the plant support 10d preferably includes six elements 12d laterally interconnected to form a substantially cylindrical, vertically aligned lower plant support structure which may be firmly secured in the ground by inserting the lowermost rigid connection 28 therein. The height of the plant support structure 10d may be increased by connecting an additional element 12d to each of the lower elements 12d by mutually securing the bight portions 48 of the vertically adjacent elements 12d. Laterally adjacent elements 12d are secured together as described in detail above by mutually engaging the bight portions 24 and 26.

It will thus be seen that by employing the modified elements 12d in the manner described above, a plant support 10d can be readily constructed having a height substantially double that of the plant support 10. As with the plant support 10, it will be readily understood that various numbers of elements 12d may be laterally interconnected in the manner described to provide cylindrical structures 10d of a preselected diameter.

From the foregoing it will be readily seen that the various embodiments of the present invention provide novel wire plant support structures which may be readily assembled and disassembled and conveniently stored when not in use. It will also be readily seen that a novel, reliable and rigid interconnection between adjacent wire bight portions is embodied in the present invention.

Changes may be made in the combination and arrangement of parts or elements as heretofore set forth in the specification and shown in the drawings without departing from the spirit and scope of the invention as defined in the following claims.

What is claimed is:

1. A woven wire article of manufacture comprising:
   a plurality of releasably interlocked wire strand elements each having two strand legs, with each of said strand legs formed into at least three substantially coplanar zig-zag diagonal portions, and said two-strand legs of each wire strand element together forming at least one substantially diamond-shaped segment;
   a bight portion interconnecting adjacent zig-zag diagonal portions in each of said strand legs, each of said bight portions and the adjacent zig-zag diagonal portions together substantially forming a W in configuration when viewed normal to the plane of the zig-zag portions, with each bight portion per se being U-shaped in configuration, and including a web portion and bight legs on opposite sides of the web portion extending to the immediately adjacent zig-zag diagonal portions, each of said wire strand elements having its strand legs interconnected at at least two opposite corners of each of said diamond-shaped segments; and
   each pair of interlocked wire strand elements having a pair of said first bight portions of the respective wire strand elements in the pair of interlocked wire strand elements interconnected at a third corner of each of said diamond-shaped segments by releasable, mutual frictional engagement of said first interconnected bight portions with each other, the legs of one of said first interconnected bight portions crossed over the legs of the other of said first interconnected bight portions and the web portions of each of said first interconnected bight portions being twisted through an angle of more than 180° from the plane of the zig-zag diagonal portions adjacent the respective first bight portions in which the respective web portion is located to form a partially closed hook with its respective adjacent bight legs, and the web portions of said first interconnected bight portions extending substantially parallel to each other, said first interconnected bight portions being physically interlocked in an interference fit to prevent their separation from each other except by forcing said web portions of the first bight portions to yield in a direction opposite the direction in which the respective web portions have been twisted through said angle and to move past each other as said separation is effected.

2. A woven wire article of manufacture as defined in claim 1 wherein interconnection of the two strand legs of each of said wire strand elements at one of said two opposite corners is effected by releasable, frictional, mutual engagement of a second pair of said bight portions within the same wire strand element with each other, said engaged second pair of bight portions having the bight legs of one bight portion in said second pair crossed over the bight legs of the other engaged bight portion in said engaged second pair of bight portions, and the web portion of each of the bight portions in said second pair of engaged bight portions being twisted through an angle of more than 180° from the plane of the zig-zag diagonal portions adjacent the respective bight portions in which each of said twisted web portions is located to form a partially closed hook with its respective adjacent legs, the web portions of said engaged bight portions in said second pair extending substantially parallel to each other, said bight portions in said second pair being physically interlocked in an interference fit identical to the interference fit described as characteristic of the first-mentioned bight portions to prevent separation from each other except by forcing said web portions thereof to yield in a direction opposite the direction they are twisted through their respective angles and move past each other in undergoing separation.

3. A woven wire article of manufacture defined in claim 1 wherein said releasably interlocked wire strands are an integrated and an uninterrupted unitary single wire having segments identifiable as the individual interlocked wire strand elements.

* * * * *

UNITED STATES PATENT OFFICE
CERTIFICATE OF CORRECTION

Patent No. 4,081,148     Dated March 28, 1978

Inventor(s) George W. Murphy

It is certified that error appears in the above-identified patent and that said Letters Patent are hereby corrected as shown below:

Col. 2, line 22, delete "12" ;

Col. 2, line 31, change "Each element 12" to --Each of the strand elements 12A - 12F-- ;

Col. 3, line 66, after "unitary" delete "of" ;

Col. 3, line 67, delete the word "a" ;

Col. 4, line 1, change "sections" to --segments-- ;

Col. 6, line 18, after "wherein" insert --the-- .

Signed and Sealed this

Fifteenth Day of August 1978

[SEAL]

Attest:

RUTH C. MASON
Attesting Officer

DONALD W. BANNER
Commissioner of Patents and Trademarks